(12) United States Patent
Chou et al.

(10) Patent No.: US 8,736,705 B2
(45) Date of Patent: May 27, 2014

(54) ELECTRONIC DEVICE AND METHOD FOR SELECTING MENUS

(75) Inventors: Jin-Jye Chou, New Taipei (TW); Hsi-Hsun Huang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 151 days.

(21) Appl. No.: 13/304,321

(22) Filed: Nov. 24, 2011

(65) Prior Publication Data

US 2013/0057717 A1  Mar. 7, 2013

(30) Foreign Application Priority Data

Sep. 6, 2011  (TW) .................................. 100131997

(51) Int. Cl.
*H04N 5/228* (2006.01)
(52) U.S. Cl.
USPC ............. 348/222.1; 348/333.01; 348/333.02; 348/14.03
(58) Field of Classification Search
USPC .................. 348/222.1, 333.01, 333.02, 14.03
See application file for complete search history.

(56) References Cited

U.S. PATENT DOCUMENTS 6,160,899 A    12/2000  Lee et al.
8,144,121 B2 *  3/2012  Kitaura ......................... 345/156

\* cited by examiner

*Primary Examiner* — Yogesh Aggarwal
(74) *Attorney, Agent, or Firm* — Novak Druce Connolly Bove + Quigg LLP

(57) ABSTRACT

An electronic device includes a camera module, a user interface module, a display module and a detection module. The electronic device continuously captures face image of face areas of a user in response to entering a menu selecting mode, displays an initial face image divided into a plurality of face regions relationships between the face regions and menus on the display module. The detection module notifies the user interface module the selected face region that is selected according to hand placement of a hand of the user on a corresponding face area of a face of the user for more than a predetermined timer period. Then the user interface module determines a menu of the current content that corresponds to the selected face region is selected corresponding to the relationships between the face regions and the menus.

12 Claims, 4 Drawing Sheets

ELECTRONIC DEVICE AND METHOD FOR SELECTING MENUS

BACKGROUND

1. Technical Field

The disclosure relates to electronic devices, and particularly to an electronic device with a camera module.

2. Description of Related Art

Connected TV have become more and more popular due to providing abundant network content such as news and video and movie content. However, the connected TV needs complex menus to display the network content and video and movie content. Therefore, the connected TV needs complex remote controller to control, which is inconvenient for users.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
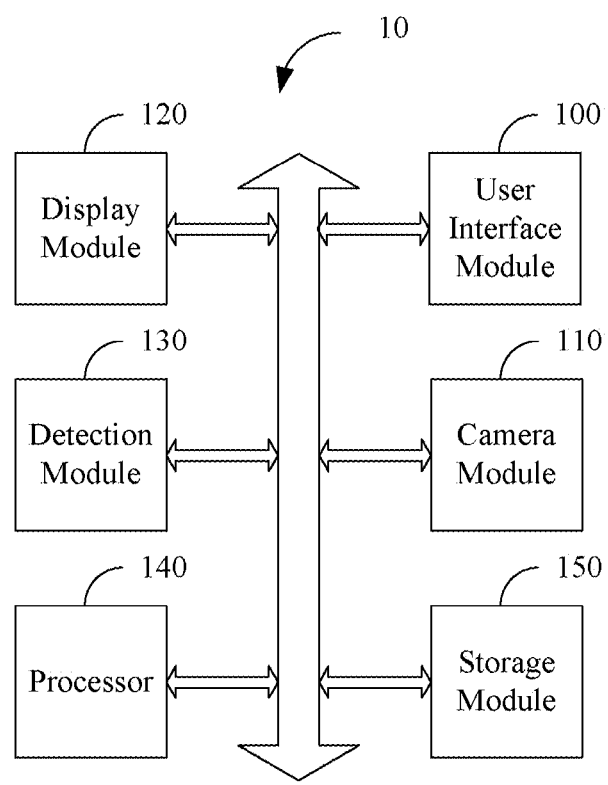
FIG. 1 is a schematic diagram of one embodiment of an electronic device as disclosed.

FIG. 1 is a schematic diagram of one embodiment of an electronic device 10 as disclosed. In one embodiment, the electronic device 10 includes a user interface module 100, a camera module 110, a display module 120, a detection module 130, a processor 140, and a storage module 150. The electronic device 10, such as, a connected TV or a video device, can selectively enter a menu selecting mode after being powered on or according to selection of a user using a remote controller. In the menu selecting mode, the electronic device 10 displays a plurality of menus on the display module 120 that correspond to current content that is being displayed on the display module 120. The plurality of menus are selectable by the user. For example, if the electronic device 10 is in an idle state (e.g., not playing a movie), and enters the menu selecting mode, the electronic device 10 can display an alarm clock menu, a music menu, and/or a message menu, for example. If the electronic device 10 is playing music and enters the menu selecting mode, the electronic device 10 can display a next menu, a forwarding menu, a backward menu, for example. Thus, the user can select favorite menus to view corresponding content or do corresponding operations.

The camera module 110 is triggered after the electronic device 10 enters the menu selecting module and is used to continuously capture face images of a face area of the user. The camera module 110 is positioned on the electronic device 10 such that the camera module 110 can focus on the face area of the user, and tracks the face image of the user. In one embodiment, the face area of the user includes areas of a head, a neck, a chest, and ears and areas above the head of the user. The user interface module 100 receives an initial face image of the user from the camera module 110, divides the initial face image into a plurality of face regions, and establishes relationships between the plurality of face regions and a plurality of menus of the current content displayed on the display module 120. In one embodiment, the user interface module 100 divides the initial face image into the plurality of face regions of a predetermined number, for example, nine or twelve.

Figure 2:
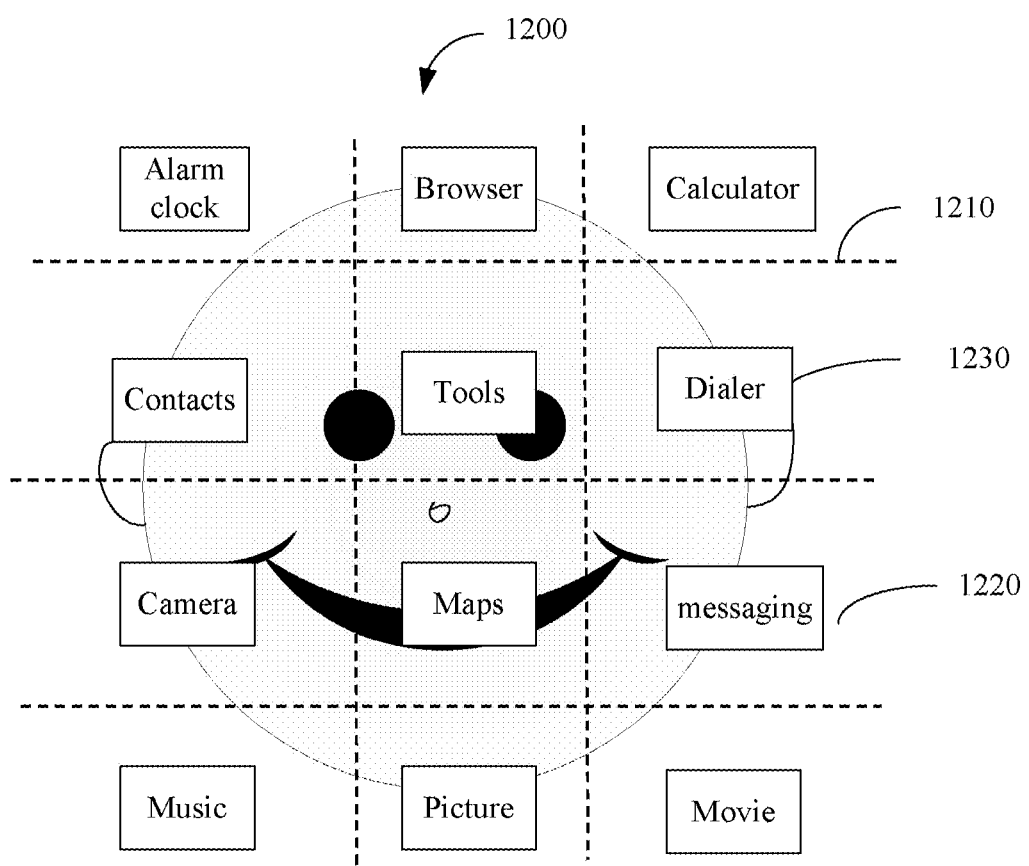
FIG. 2 is a schematic diagram of one embodiment of menu displaying of a display module of an electronic device.

The display module 120 displays the initial face image divided into the plurality of face regions and corresponding menus of the current content for selection. In one embodiment, an example of a menu displayed on the display module 120 is shown in FIG. 2. The display module 120 displays an initial face image 1200, boundaries 1210 dividing the initial face image 1200 into twelve face regions 1220, and twelve menus 1230 corresponding to the twelve face regions 1220. The initial face image 1200 and the boundaries 1210 are displayed in the background. In alternative embodiments, the face regions 1220 are divided according to other shapes, such as, a ring shape, or according to facial features. The user can view his/her face image and corresponding menus displayed on the display module 120 like he/she is standing in front of a mirror.

If the user wants to select a favorite menu 1230 displayed on the display module 120, he/she can put his/her hand (or a portion of the hand or a finger) on a face area of his/her own face corresponding to the face regions 1220 of the favorite menu 1230 for a period of time. The camera module 110 captures a current face image of the user corresponding to the face area selected by the hand of the user. The electronic device 10 detects and determines face regions of the face image corresponding to the selected face area to determine selected menus of the current content. The electronic device 10 displays the selected menu in a different way and displays content of the selected menu according to the selection of the face area. Thus, the user does not need to use a remote controller to select/change menus of the current content and only needs to put his/her hand on a corresponding face area.

For example, if the user wants to select a browser menu 1230, because the display module 120 displays that the browser menu 1230 corresponds to the face region 1220 above his/her own head, the user can put hand on an area above his/her own head to select the browser menu 1230 for a period of time. The camera module 110 captures a face image of the user with the face area above his/her own head selected by the hand, and the electronic device 10 determines the browser menu 1230 is selected by the user via his/her hand motion (or placement).

The detection module 130 continuously receives the face images from the camera module 110, and detects selection of a face region according to the captured faces images. The selection of the face region is according to hand placement of a hand of the user on a corresponding face area of a face of the user for more than a predetermined timer period. In the embodiment, the detection module 130 first determines if one of the plurality of face regions is selected, if a face region is selected, the detection module 130 determines that the user may begin to select a menu. The detection module 130 further determines if the face region is selected longer than the predetermined time period to omit involuntary hand motions (or placement) of the user. If the face region is selected longer than the predetermined time period, such as, ten seconds, the detection module 130 considers that the user selects a menu by hand motions (or placement), and notifies the user interface module 100 of the selected face region. In one embodiment, the selected face region may cover several face regions, so the detection module 130 determines the selected face region according to a highest point of the selected face regions. For example, the selected face region captured by the camera module 110 includes the face regions of the forehead, the nose, and the jaw, the detection module 130 determines that the selected face region is the forehead region. The detection module 130 compares the current face image with a previous face image to determine if the user selects a menu by hand motions (or placement).

The user interface module 100 further determines a menu of the current content that corresponds to the selected face region selected longer than the predetermined time period is selected according to the relationships between the plurality of face regions and the plurality of menus of the current content, by the user putting his/her hand on corresponding face area of his/her own face, and operates correspondingly. In one embodiment, the user interface module 100 controls the display module 120 to display the selected menu by the user in a different way from the other menus displayed on the display module 120 in response to the user interface module 100 determining the selected menu. In one embodiment, the display module 120 displays the selected menu with a different color. The display module 120 further displays content of the selected menu.

The processor 140 executes one or more computerized instructions in respond to the camera module 110, the user interface module 100, the display module 120, and the detection module 130. The storage module 150 is any non-transitory data storage device that can store data which can be thereafter read by a computer system. Examples of the non-transitory data storage device include read-only memory (ROM), random-access memory (RAM), CD-ROMs, magnetic tapes, floppy disks, and optical data storage device.

Figure 3:
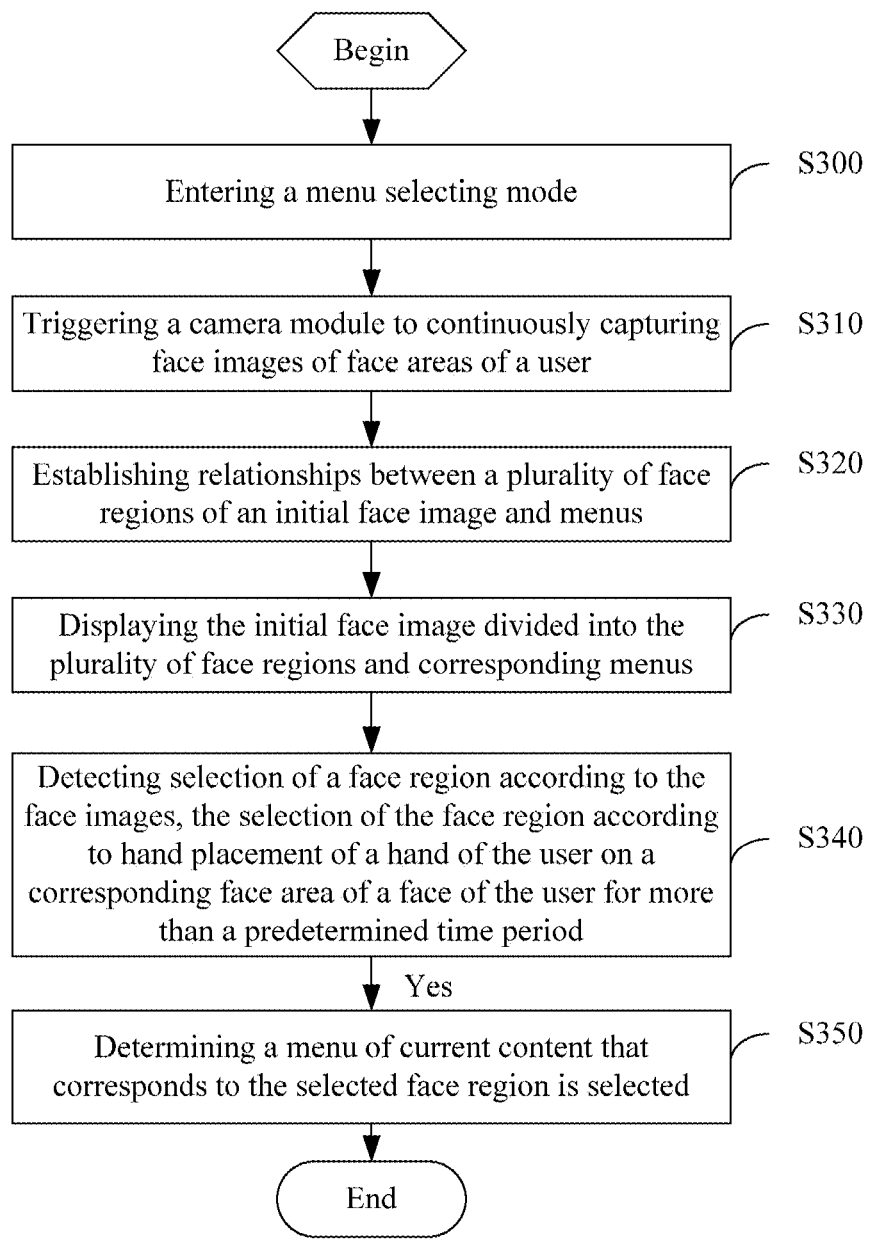
FIG. 3 is a flowchart of one embodiment of a method for selecting menus as disclosed.

FIG. 3 is a flowchart of one embodiment of a method for selecting menus as disclosed. Depending on the embodiment, additional blocks may be added, others deleted, and the ordering of the blocks may be changed while remaining well within the scope of the disclosure. In step S300, the electronic device 10 enters a menu selecting mode after powered on or according to selection of a user by a remote controller. In the menu selecting mode, the display module 120 displays a plurality of menus corresponding to current content displayed on the display module 120, and the user can select favorite menu by put hand on his/her own corresponding face area to make the electronic device 10 to display or operate. In step S310, the camera module 110 is triggered to continuously capture face images of face areas of the user.

In step S320, the user interface module 100 divides an initial face image into a plurality of face regions, and establishes relationships between the plurality of face regions and a plurality of menus of the current content. In step S330, the display module 120 displays the initial face image divided into the plurality of face regions and corresponding menus of the current content for selection by the user putting his/her hand on corresponding face areas of his/her own face. Thus, the user can intuitively and clearly know the face area corresponding to the favorite menu according to the display module 120, feeling like he/she is standing in front of a mirror, and touches the face area of his/her own face by hand to select the favorite menu, which is convenient for the user.

In step S340, the detection module 130 detects selection of a face region according to the face images captured by the camera module 110. The selection of the face region is according to hand placement of a hand of the user on a corresponding face area of a face of the user for more than a predetermined time period. The detection module 130 first determines if a face region is selected. If a face region is selected, the detection module 130 determines that the user may begin to select a menu. In one embodiment, if the user put hand on a face area of his/her face to select menus, the current face image captured by the camera module 110 is different from a previous one. Thus, the detection module 130 compares the current face image with the previous face image to determine if a selected face region changes.

If the detection module 130 determines a face region is selected, the detection module 130 determines if the selected face region is selected longer than the predetermined time period, such as, ten seconds. If the selected face region is selected less than the predetermined time period, the detection module 130 determines the shading motion of the user is an involuntary hand motion and the user does not select a menu.

In step S350, the user interface module 100 determines a menu of the current content that corresponds to the selected face region is selected by the user according to the relationships between the plurality of face regions and the plurality of menus of the current content. In one embodiment, the detection module 130 determines the selected face region according to a highest point of the selected face region, and notifies the user interface module 100 the selected face region to make the user interface module 100 to determine the selected menu by the user. Thus, the user can select the favorite menu by putting hand on corresponding face areas of his/her own face, which avoids complex remote controller operations or keypad operation and is convenient and simple for the user. In addition, the electronic device 10 and the method for selecting menus only use the camera module 110 to track the face images of the user without any additional modules, which is easy to implement and has low costs.

Figure 4:
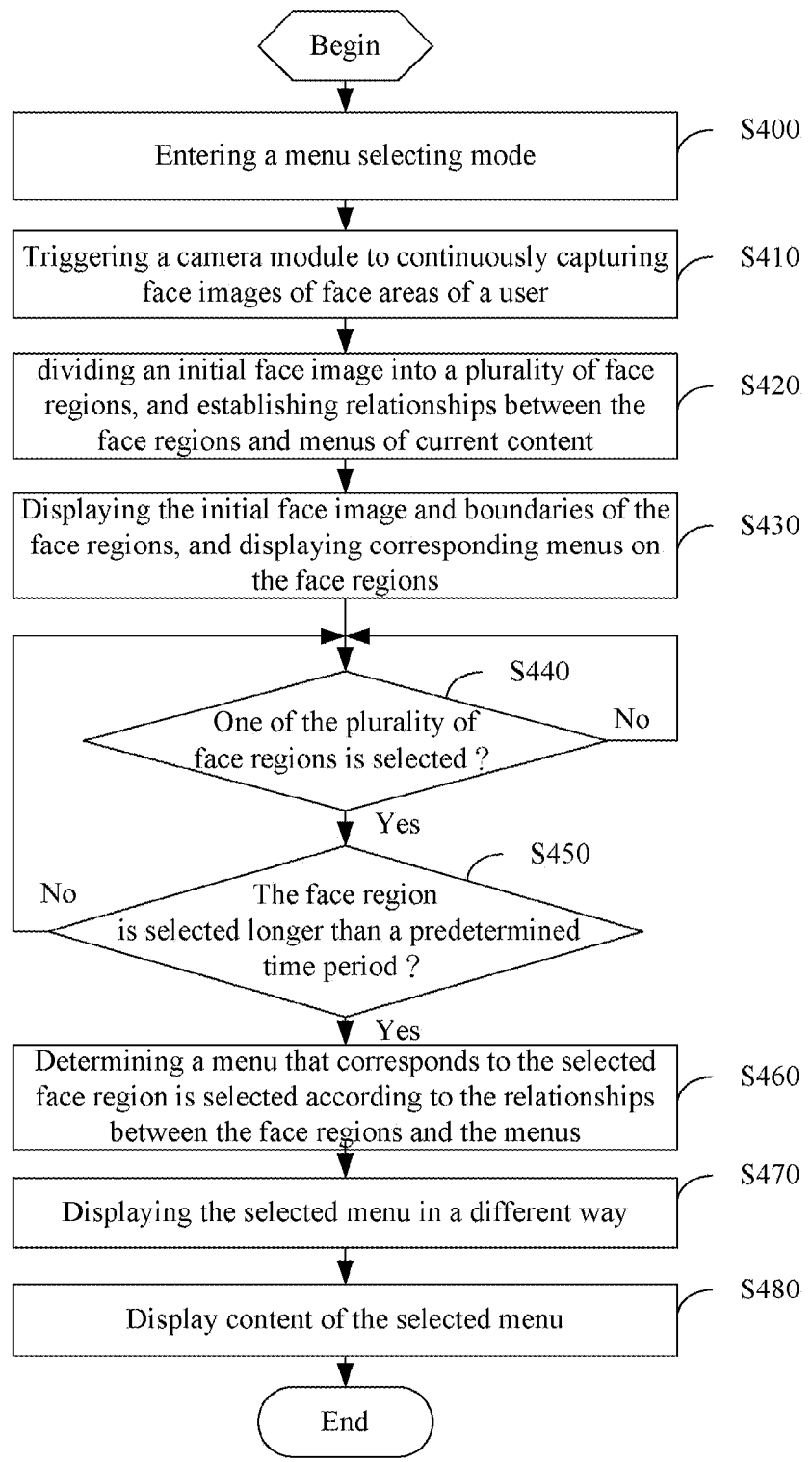
FIG. 4 is a flowchart of another embodiment of a method for selecting menus as disclosed.

FIG. 4 is a flowchart of another embodiment of the method for selecting menus as disclosed. Depending on the embodiment, additional blocks may be added, others deleted, and the ordering of the blocks may be changed while remaining well within the scope of the disclosure. In step S400, the electronic device 10 enters a menu selecting mode after powered on or according to selection of a user by a remote controller. In the menu selecting mode, the display module 120 displays a plurality of menus corresponding to current content displayed on the display module 120, and the user can select favorite menu by touching his/her corresponding face areas of his/her own face by hand to make the electronic device 10 to display or operate. In step S410, the camera module 110 is triggered to continuously capture face images of the user. In one embodiment, the camera module 110 sends an initial face image to the user interface module 100, and sends all the face images to the detection module 130. The camera module 110 may capture the face images of the user according to a preset period, such as two seconds.

In step S420, the user interface module 100 divides the initial face image into a plurality of face regions of a predetermined number, and establishes the relationships between the plurality of face regions and a plurality of menus of the current content displayed on the display module 120. In step S430, the display module 120 displays the initial face image and boundaries of the plurality of face regions, and displays corresponding menus of the current content on the plurality of face regions for selection. Thus, the user can intuitively and clearly know a face area of his/her own face corresponding to the favorite menu according to the display module 120, feeling like she/he is standing in front of a mirror, and puts hand on the face area of his/her own face to select the favorite menu, which is convenient for the user.

In step S440, the detection module 130 detects if one of the plurality of face regions is selected. If a face region is selected, the detection module 130 determines that the user may begin to select a menu. In one embodiment, if the user shades a face area to select menus by hand motions, a current face image captured by the camera module 110 is different from a previous one. Thus, the detection module 130 determines if a selected face region changes by comparing the current face image with the previous face image.

If the detection module 130 determines a face region is selected, in step S450, the detection module 130 determines if the selected face region is selected longer than a predetermined time period, such as, ten seconds. If the selected face region is selected less than the predetermined time period, the detection module 130 determines that the shading motion of the user is an involuntary hand motion and the user does not select a menu, and the process returns to the step S440.

If the selected face region is selected longer than the predetermined time, in step S460, the user interface module 100 determines a menu of the current content that corresponds to the selected face region is selected by the user according to the relationships between the plurality of face regions and the plurality of menus of the current content. In one embodiment, the detection module 130 determines the selected face region according to a highest point of the selected face region, and notifies the user interface module 100 of the selected face region to make the user interface module 100 to determine the menu selected by the user.

In step S470, the user interface module 100 controls the display module 120 to display the selected menu in a different way from other menus, such as, in a different color. In step S380, the display module 120 displays content of the selected menu.

The electronic device 10 and the method for selecting menus use the camera module 110 to track the face image of the user, and establishes and displays the relationships between the plurality of face regions of the face image and the menus of current content displayed on the display module 120. Thus, the user can select the favorite menu by putting hand on corresponding face areas of his/her own face, which avoids complex remote controller operations or keypad operation and is convenient and simple for the user. In addition, the electronic device 10 and the method for selecting menus only use the camera module 110 to track the face image of the user without any additional modules, which is easy to implement and has low costs.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. An electronic device, comprising:
a display module that displays current content of the electronic device;
a camera module that continuously captures face images of face areas of a user in response to the electronic device entering a menu selecting mode;
a user interface module that displays an initial face image divided into a plurality of face regions corresponding to the face areas on the display module, and displays relationships between the plurality of face regions and a plurality of menus of the current content on the display module; and
a detection module that detects selection of a face region according to the face images from the camera module, the selected face region according to hand placement of a hand of the user on a corresponding face area of a face of the user for more than a predetermined time period;
wherein the user interface module determines a menu of the current content that corresponds to the selected face region according to the relationships between the plurality of face regions and the plurality of menus of the current content to control the display module to display content of the selected menu.

2. The electronic device of claim 1, wherein the display module displays the initial face image and boundaries of the plurality of face regions, and displays the corresponding menus of the current content on the plurality of face regions.

3. The electronic device of claim 1, wherein the user interface module controls the display module to display the selected menu in a different way in response to the user interface module determining the menu of the current content that corresponds to the selected face region is selected.

4. The electronic device of claim 1, wherein the detection module determines the selected face region according to a highest point of the selected face region.

5. A method for selecting menus, for utilization in an electronic device comprising a camera module, the method for selecting menus comprising:
entering a menu selecting mode of the electronic device;
triggering the camera module to continuously capture face images of face areas of a user;
displaying an initial face image divided into a plurality of face regions and relationships between the plurality of face regions and a plurality of menus of current content on a display module for selection;
detecting selection of a face region according to the face images captured by the camera module, the selection of the face region according to hand placement of a hand of the user on a corresponding face area of a face of the user for more than a predetermined timer period;
determining a menu of the current content that corresponds to the selected face region is selected according to the relationships between the plurality of face regions and the plurality of menus of the current content; and
displaying content of the selected menu.

6. The method for selecting menus of claim 5, wherein step of displaying the initial face image divided into the plurality of face regions and corresponding menus of the current content for selection comprises:
displaying the initial face image and boundaries of the plurality of face regions; and
displaying the corresponding menus of the current content on the plurality of face regions.

7. The method for selecting menus of claim 5, further comprising displaying the selected menu in a different way after step of determining a menu of the current content that corresponds to the selected face region is selected.

8. The method for selecting menus of claim 5, further comprising determining the selected face region according to a highest point of the selected face region.

9. The method for selecting menus of claim 5, further comprising:
dividing the initial face image into the plurality of face regions corresponding to the face areas; and
establishing relationships between the plurality of face regions and the plurality of menus of current content displayed by the electronic device.

10. The method for selecting menus of claim 5, wherein step of detecting selection of a face region according to the face images captured by the camera module, the selection of the face region according to hand placement of a hand of the user on a corresponding face area of a face of the user for more than a predetermined timer period detecting if one of the plurality of face regions is selected according to the face images captured by the camera module, the selection of the one of the plurality of face regions according to hand placement of a hand of the user on a corresponding face area of a face of the user; and determining if the selected face region is selected longer than a predetermined time period upon the condition that the face region is selected.

11. The electronic device of claim 1, wherein the user interface module divides the initial face image into the plurality of face regions corresponding to the face areas; and the user interface module establishes relationships between the plurality of face regions and the plurality of menus of current content displayed by the electronic device.

12. The electronic device of claim 1, wherein the detection module detects if one of the plurality of face regions is selected according to the face images captured by the camera module, the selection of the one of the plurality of face regions according to hand placement of a hand of the user on a corresponding face area of a face of the user; and the user interface module determines if the selected face region is selected longer than a predetermined time period upon the condition that the face region is selected.

* * * * *